United States Patent
Gynn

[11] 3,838,888
[45] Oct. 1, 1974

[54] ELECTRIC BRAKE CONTROLLER
[75] Inventor: George E. Gynn, Fort Wayne, Ind.
[73] Assignee: Syncro Corporation, Oxford, Mich.
[22] Filed: Apr. 2, 1973
[21] Appl. No.: 346,755

[52] U.S. Cl. ............... 303/20, 188/3 R, 188/106 P, 303/3, 303/15, 338/39, 338/96, 338/108
[51] Int. Cl. ............................................. B60t 13/70
[58] Field of Search ................ 188/3 R, 106 P, 359; 303/2, 3, 13, 7, 20; 338/36, 39, 90, 96, 108, 128–139, 142, 154

[56] References Cited
UNITED STATES PATENTS

| | | | |
|---|---|---|---|
| 2,575,230 | 11/1951 | Mork | 338/96 X |
| 3,336,558 | 8/1967 | Wright | 338/90 X |
| 3,574,414 | 4/1971 | Jacob | 303/20 X |
| 3,610,699 | 10/1971 | Ladoniczki et al. | 188/3 R X |
| 3,629,776 | 12/1971 | Watano | 338/142 X |
| 3,704,042 | 11/1972 | Sturgeon | 303/20 X |

Primary Examiner—Trygve M. Blix
Assistant Examiner—Stephen G. Kunin
Attorney, Agent, or Firm—Harness, Dickey & Pierce

[57] ABSTRACT

A control unit with input and output terminals connected between the battery and the electric brakes of a trailer or like vehicle having a ceramic base with a resistive layer thereon, a contact member which is movable into contact with the resistive layer, and hydraulic and manual apparatus for moving the contact member. Movement of the contact member into engagement with the resistive layer sequentially inserts resistive paths between the input and the output terminals of the control unit to reduce the resistance across the input and output terminals of the control unit and to increase the flow of current to the brake.

20 Claims, 11 Drawing Figures

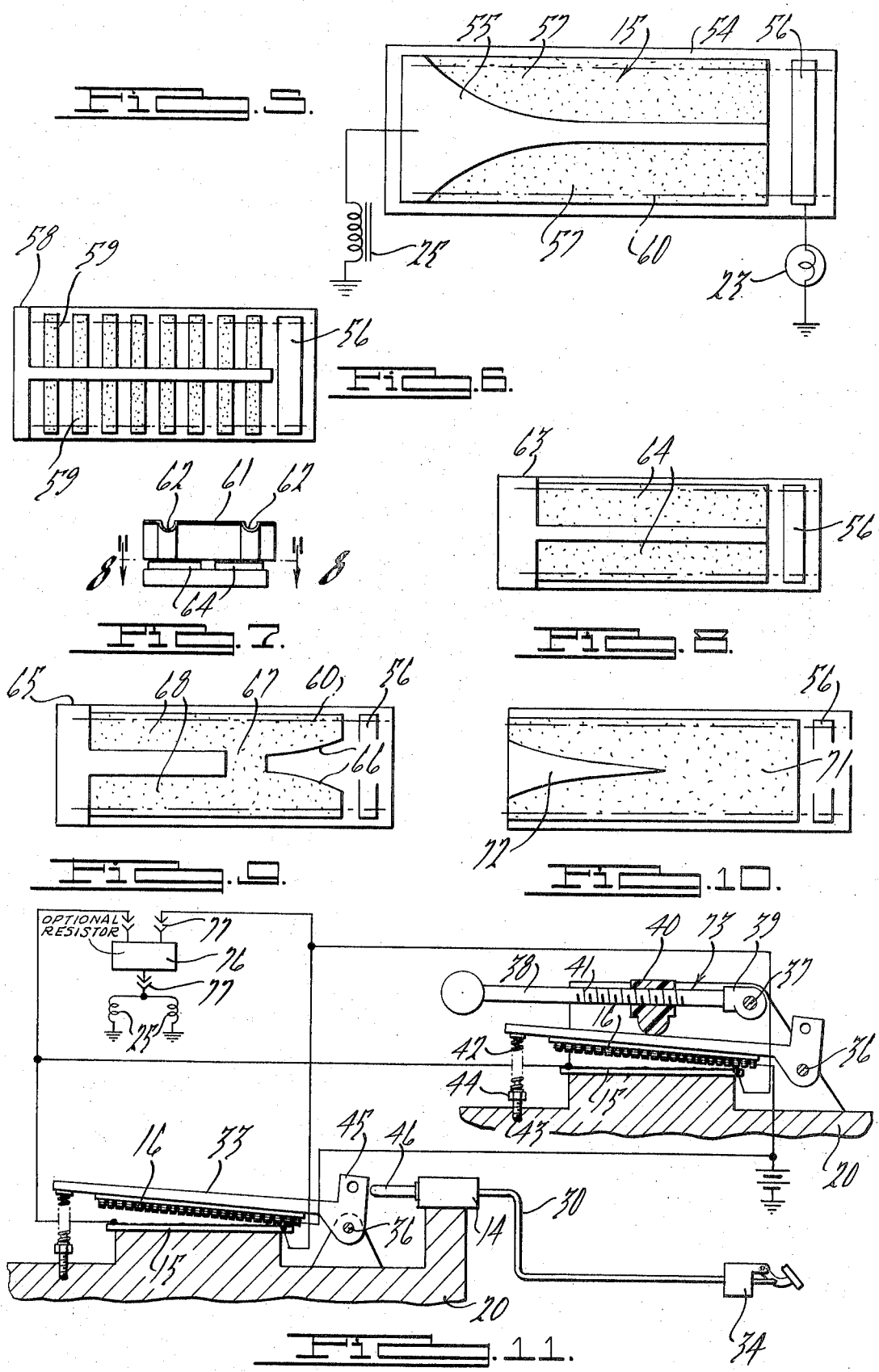

ELECTRIC BRAKE CONTROLLER

BACKGROUND AND SUMMARY OF THE INVENTION

The present invention pertains to a novel control unit for electric brakes which features a resistor comprising a ceramic substrate and a layer of a resistive material, deposited on the ceramic substrate. The resistive layer is adapted to form a plurality of resistive paths which are each connected in common at one portion thereof and which are each disposed for progressive or sequential engagement of a contact element at another portion thereof. The resistive paths are connected in parallel between the battery and the brakes so that the current between the battery and the brakes is transferred through none of the resistive paths when the contact element is not engaged with the resistive layer. As the contact element is progressively or sequentially moved into engagement with the resistive paths, more and more of the resistive paths are inserted in parallel into the circuit between the battery and the brakes by the contact element to decrease the overall resistance between the battery and the brakes thereby increasing the current flow to the brakes. A brake controller according to the present invention is found to provide smooth control of the brakes of the vehicle without contact arcing. Importantly, the current flow path area is increased as the magnitude of the current is increased with a corresponding increase in the ability of the resistance element to radiate heat. Moreover, the unit is substantially failsafe since if any particular resistive path becomes damaged or opens, the control of the brake is not lost since the remaining paths are still operational to provide current to the electric brakes.

The resistive film can be configured to vary the braking response of the trailer brakes with increased application of the towing vehicle brakes, for example, by providing increasing rate of trailer brake application with increasing towing vehicle brake application.

Two sets of control units according to the present invention may be employed, one actuated manually and the other hydraulically. The control units are preferably placed in parallel so that either one may be employed individually or both can be employed at the same time. The manual unit is preferably retained in the driving area while the hydraulic unit is preferably located adjacent to the master cylinder. This arrangement provides a safety advantage since it eliminates the hydraulic conduit to the driving area of the driven vehicle.

BRIEF DESCRIPTION OF THE DRAWINGS

FIG. 5 is a plan view of the resistance element illustrated in FIG. 2, as viewed from the point 4 thereof;

FIG. 6 is a view of a resistance element, similar to that illustrated in FIG. 5;

FIG. 7 is a view of a resistance element and contact element similar to that illustrated in FIG. 4, showing another form of the invention;

FIG. 8 is a view of the structure illustrated in FIG. 7, taken on the line 8—8 thereof;

FIG. 9 is a view of a resistance element, similar to that illustrated in FIG. 8, showing another form thereof;

FIG. 10 is a view of a resistance element, similar to that illustrated in FIG. 9, showing another form thereof; and FIG. 11 is a view of a brake control system in which a pair of resistance elements with cooperative contact elements are mounted in parallel and operated independently by manual and hydraulic means.

DESCRIPTION OF THE PREFERRED EMBODIMENTS

Figure 1:
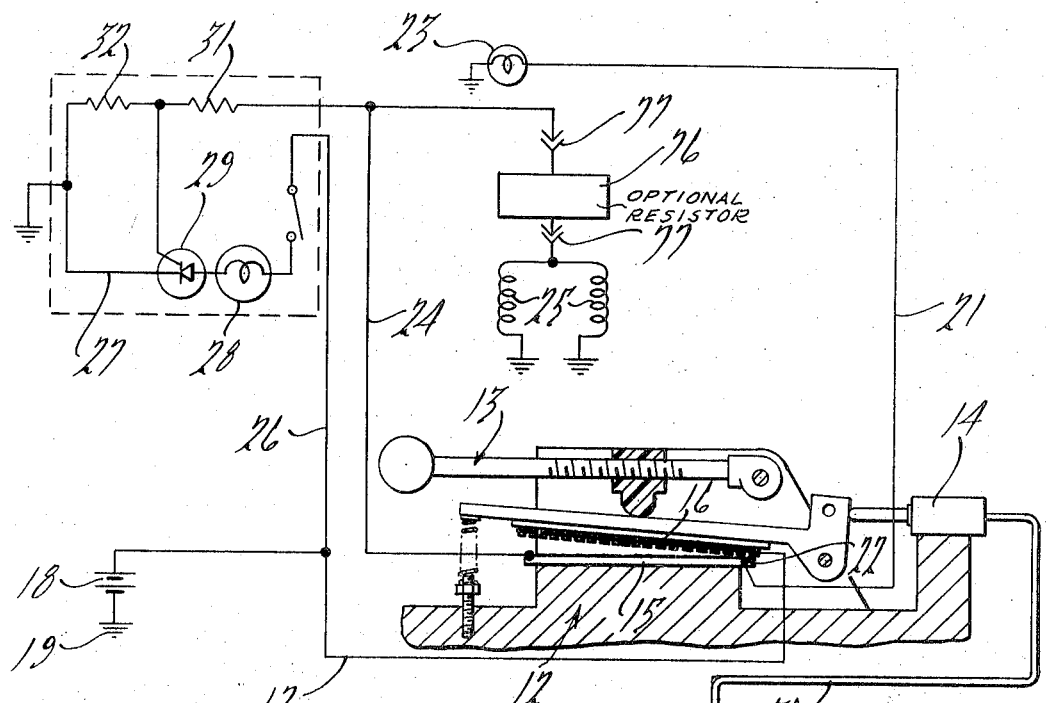
FIG. 1 is a view of a braking system for a vehicle which includes a control unit of the present invention.

Referring to FIGS. 1 to 5, a brake control system is illustrated embodying a control unit 12 having a manual control element 13 and a hydraulic cylinder 14 for varying the overall resistance of the control unit 12 by the movement of a contact element 16 into a resistance element 15. The contact element 16 has one end connected by a conductor 17 to the positive terminal of a battery 18. The other terminal of the battery 18 is connected to the ground at 19. The resistance element 15 has an end contact 22 which is positioned to make initial contact with the contact element 16 on movement thereof and which is connected by a conductor 21 to energize the tail lamps 23 on the vehicle when the brakes are applied. A conductor 24 connects the opposite end of the resistance element 15 to the electric brake coils 25.

A conductor 26 connects the battery 18 to a lamp 28 of A circuit 27 for indicating when the brakes are not connected or are defective. The circuit 27 includes an SCR 29 which is connected between the lamp 28 and ground so that the SCR 29 is effective to light the lamp 28 when it is fired. The gating circuit of the SCR 29 includes resistors 31 and 32 which are connected to receive the brake signal from the control unit 12. Should the brakes be disconnected or defective, the voltage to the gate of the SCR 29 would be higher than if the low impedance of the brake coils 25 were in the circuit. This higher voltage will cause the SCR 29 to go into conduction to light the lamp 28 and apprise the operator that the brake system is defective. When no brake signal is provided by the control unit 12, the lamp 28 will be extinquished.

If the unit is mounted within the driver compartment of the driven vehicle, the conduit 30 from the master cylinder 34 will be extended thereinto and connected to the piston and cylinder 14 of the control unit 12. The control unit 12 includes a base 20 which supports the resistor unit 15 and an arm 33 which carries the contact element 16 above the resistor unit. The arm 33 is mounted on a pivot 36 on the base 20 for rotational movement toward and away from the resistor element 15. The manual control element 13 is secured to the base 20 on a pivot 37. An actuating rod 38 of the manual unit is pivotally connected to a pivot member 39 and is provided with a central threaded section 41 which moves a fulcrum 40 along the actuating rod as it is rotated to adjust the fulcrum therealong. This changes the point of applied force to the arm 33 during manual operation, and particularly, to adjust the response of the control unit 12 to movement of the manual control element 13. The opposite end of the arm from the pivot 36 is biased upwardly by a spring 42 mounted over a stud 43 and adjusted in tension by a nut 44.

Figures 3, 4:
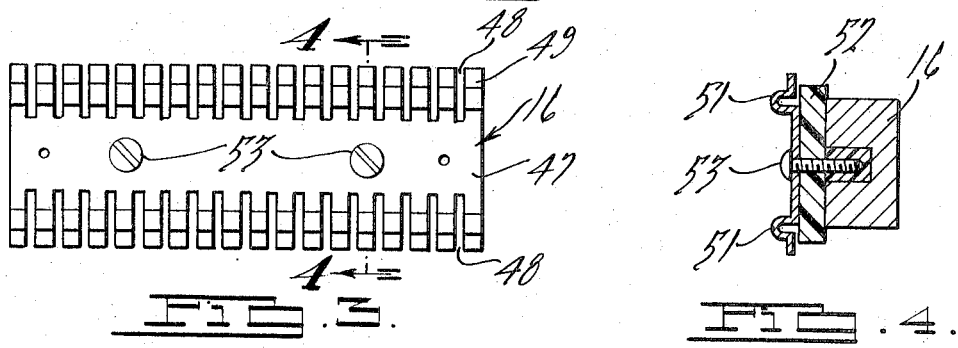
FIG. 3 is a view of a contact element having fingers for engaging a resistive layer as viewed from the point 3 of FIG. 2.
FIG. 4 is a sectional view of the structure illustrated in FIG. 3, taken on the line 4—4 thereof.

The arm 33 has an offset portion 45 engaged by a piston rod 46 of the cylinder 14 to which the conduit 30 is connected. With this arrangement, the arm 33 may be moved toward and away from the resistor element 15 by the operation of the manual central element 13 or the cylinder 14 or simultaneously by both. The changing of the position of the fulcrum is made in accordance with the variations in the trailer loads. As illustrated in FIGS. 3 and 4, the contact element 16 is a metal conducting plate 47 having slots 48 cut therein from opposite edges to provide fingers 49 which have reversely bent contact sections 51 adjacent to each end. The plate is mounted on an insulating strip 52 which is secured to the arm 16 by a plurality of screws 53 herein illustrated as two in number which are insulated from the arm.

As the contact element 16 is moved to progressively engage the resistance element 15, more and more resistive paths are inserted into the circuit to increase the current therethrough as will be made apparent in view of FIGS. 5 to 10 inclusive. In FIG. 5, the resistor element 15 has a ceramic base 54 of suitable thermal conductivity having a continuous layer or "thick film" of resistive material 57 deposited thereon as by baking a resistive paste on the ceramic substrate 54. A thin metallic conductor 55 is affixed to and in electrical contact with the resistive layer 57. The metallic conductor 57 has opposed curved sides as shown so as to provide a resistive layer 57 which is contoured or configured so as to have a decreasing transverse dimension from right to left as seen in the figure. An additional metallic contact is positioned at 56 near the right end of the resistive layer 57 and which is connected to a tail lamp 23 as shown. The brake coils 25 (only one being shown) are connected to the conductor 55. As the contact element 16 of FIGS. 3 and 4 is progressively rotated toward the resistance element 15 by rotation of the arm 33, more and more fingers 49 engage the resistive layer 57 along dash line 60 to insert an increasing number of resistive paths between the contact element 16 and the conductor 55. As more and more resistive paths are inserted between the contact element 16 and the conductor 55, the resistance therebetween is reduced. Since the contact element 16 is connected to the battery and the conductor 55 is connected to the brake coils 25, this reduction in resistance results in an increase in current to the brake coils 25 and a consequent increase in braking.

The construction shown in FIGS. 3 and 4 wherein two spaced rows of fingers 49 are provided is preferred over a construction having only a single row of fingers since mechanical forces are balanced and if one finger breaks, the opposite finger still serves to function to reduce the variation in braking when the area of contact of the contact element passes the broken finger.

Figure 2:
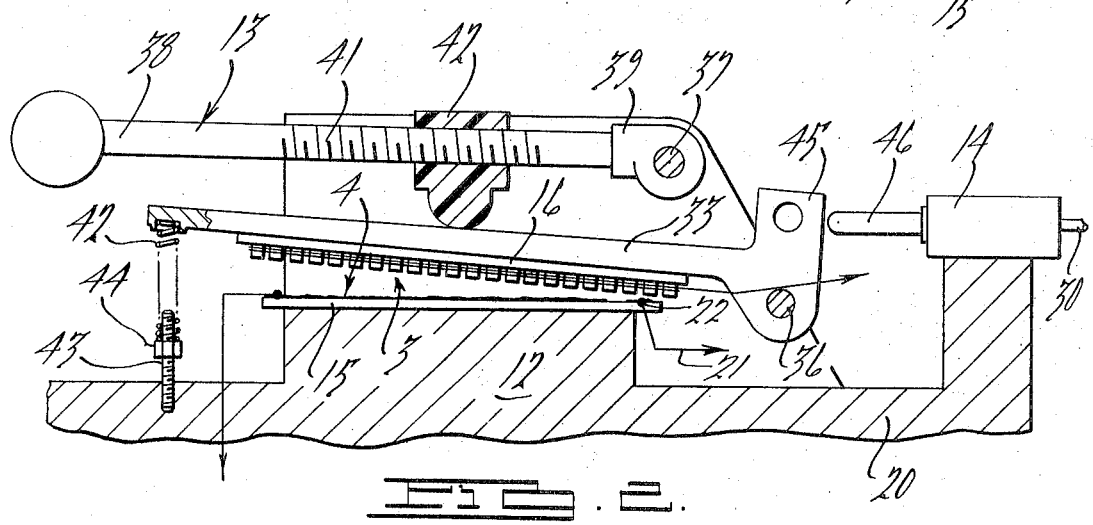
FIG. 2 is an enlarged view of the control unit illustrated in FIG. 1.

Although, in the preferred form of the present invention, the resistance element 15 has a resistive layer which is continuous as shown in FIG. 5 so that the parallel resistive paths join and overlap, and the contact element 16 has a plurality of fingers 49 as shown in FIGS. 2-4, if desired, the resistance element 15 may have a discontinuous resistive layer to provide discrete resistive paths and the contact element 16 may have a continuous engaging surface. For example, in FIG. 6, a resistance element 15a is illustrated having a conductor 58 which joins a central portion of the plurality of discrete resistive strips 59 which are individually connected into the circuit between the brake coils 25 and the battery as the contact element 16 is moved sequentially from right to left as seen in the figure. As illustrated in FIG. 7, a contact element 16a may be provided which is a continuous strip 61 of contact material having continuous engaging surfaces at 62. For example, the contact element 16a may engage a resistance element 15a having a resistive layer as shown in FIG. 6 or may engage with a resistance element 15b having a resistive layer as shown in FIGS. 7 and 8. The resistance element 15b has a pair of rectangular resistive layers 64 which are joined at their inward edge by a conductor 63, which in this case, is laid directly on the ceramic substrate 54 rather than applied over the resistive layer 64. The rectangular configuration of the resistive layer 64 alters the function of current flow between the contact element 16 and the conductor 63 versus progression of the contact element 16 across the resistance element 15. More particularly, in the embodiment of FIG. 5, the current flow increases at an increasing rate as the contact element 16 progresses from right to left during the latter portion of the progression of the contact element 16, the portion in which the conductor 55 is provided with an outward curvature. In the case of the construction of FIG. 8, the current from the battery to the brake coils 25 will increase at a decreasing rate as the contact element 16 progresses from right to left.

Modifications of the resistive area independently of the conductor configuration can also be made. For example, in FIG. 9, a resistance element 15c is shown having a resistive layer 68 and a T-shaped conductor 65. It can be seen that the leftward portion of the resistance element 15c has a current relationship with progression of the contact element 16 which is similar to that shown in FIG. 8. However, the rightward portion of the element 15c has a modified relationship as provided by the resistive layer portion 67 which includes two curved opposed edges 66 providing an axial gap in the resistive layer 68. As the contact element progresses along the dash line 60, little change in current initially occurs with the progression of the contact element 16. This is due to the considerable spacing between the contact element 16 at its initial contact point and the conductor 65 and the relatively restricted conducting path provided by the curved edges 66. As the contact element 16 approaches the rightward end of the conductor 65, the current to the brake coils 25 increases at an increasing rate. Thereafter, as the contact element 16 approaches the leftward edge of the resistive layer 68 the current increases at a decreasing rate.

In FIG. 10, yet another exemplary embodiment of a contact element is illustrated. In FIG. 10, a contact element 15d is seen to include a rather large resistive layer 71 having a relatively small conductor 72 in electrical contact therewith. As the contact element 16 is moved along the dash line 60, an initial relatively gradual increase in current to the brake coils 25 is provided. Thereafter, the current between the contact element 16 and the conductor 72 increases at a considerably increased rate as the far leftward end of the resistance element 15d is reached.

In view of the above, it will be appreciated that the resistive layer and the associated contact can be shaped or configured to provide a "braking" curve, i.e. a relationship between contact travel and current flow to the brakes, which can closely approximate an ideal condition. Generally, in the prior art systems, this can only be accomplished by varying the diameter or configuration of a coil which makes the construction of the wiping mechanism exceptionally difficult.

Another interesting arrangement of the system is illustrated in FIG. 11 wherein a manually actuated control element 73 and a hydraulically actuated control element 74 is utilized, the former within the driving compartment of the driven vehicle and the latter adjacent to the master brake cylinder thereof. This arrangement eliminates the hydraulic conductor from the master cylinder to within the driving compartment. In the manual unit, the actuating rod 38 is rotatably supported in the pivot member 39 which is mounted on a pivot 37. The thread 41 adjusts the fulcrum 40 along the rod 38 when rotated to position the fulcrum as previously described. The contact element 16 is moved into engagement with the resistor element 15 by the downward movement of the free end of the rod 38. Upon the release of the rod, the spring 42 will return the contact element 16 to its initial position out of engagement with the resistor element 15. The tension on the spring 42 is adjustable by the nut 44 on the threaded stud 43.

A second contact element 16 and resistance element 15 have a similar relationship with the contact element 16 mounted on the arm 33 which is secured by a pivot 36 to the base 20. The piston rod 46 of the cylinder 14 engages the projecting end 45 of the arm 33 to produce the change in resistance in the circuit to the brake coils of the trailer. The two sets of resistors 15 and contact elements 16 are connected in parallel in the circuit between the battery and the brake coils 25. When the foot operated brake element 75 actuates the master cylinder 34 for operating the brakes of the driven vehicle, the conduit 30 to the cylinder 14 will operate the piston rod 46 and the arm 33 to actuate the contact element 16 and connect an increasing number of resistive paths into the circuit to thereby increase the flow of current to the coils 25 and to increase trailer braking. It will be noted in this arrangement that the fluid line 33 does not enter into the driver's compartment. Should the driver desire to operate the brakes of the trailer directly, the rod 38 is moved downwardly to produce the increase in current to the brake coils 25.

The control unit of this invention may be used in combination with a fixed resistor to adapt the control unit for a particular vehicle/load/trailer combination. For example, in FIG. 1, a selected resistor 76 has been inserted in the circuit to the brake coils 25. The proper selection of the resistor 76 will permit the system to function properly for a trailer having a specific load. Should the load change a substantial amount, or a trailer used having a different number of size or brake coils, another resistor should be selected to replace the one used for the prior load.

It will now be appreciated that the present invention provides a control unit for an electric brake system which may be economically constructed and which has a high degree of flexibility in design so that it may be readily adapted for a wide range of applications. Some of the advantages of the control unit lies in the fact that resistance elements or paths are added in parallel, and therefore, as the current through the resistance element increases, the area of the resistance element through which the current passes is effectively increased so that radiation of heat generated by resistance losses in the element is enhanced. It will be appreciated that in most brake controllers, the resistance element portion through which the current passes is reduced as the current is increased thereby resulting in a critical heating problem when brake application is near maximum and current flow through the resistance element is the highest. Moreover, since the ceramic substrate can be supported on a large metal pedestal and in good heat transfer contact therewith, the resistance heating problem is further reduced. As yet an additional advantage, the resistive layer can be made of resistive material which has a temperature coefficient of resistance near to zero, so that the braking is not varied as the resistance element heats up during brake application.

While it will be apparent that the teachings herein are well calculated to teach one skilled in the art the method of making preferred embodiments of this invention, it will be appreciated that the invention is susceptible to modification, variation and change without departing from the proper scope of meaning of the subjoined claims.

I claim:

1. For an electric brake for a vehicle towed by a towing vehicle, a control unit comprising:

a resistance element for providing current therethrough from a source of electric potential to said brake, said resistance element including a continuous layer of resistive material and a conductor electrically connected with said layer of resistive material, said conductor being connectable with one of said source of electric potential and said brake; and a contact element being progressively engagable with said layer of resistive material along a predetermined path for electrical contact therewith along said path and being movable relative to said resistive layer for increasing the length of the engagement therewith along said path to increase the area of the resistive path from said contact element to said conductor thereby reducing the resistance between said contact element and said conductor and enhancing the radiation of heat generated by resistive losses in said layer of resistive material, said contact element being connectable with the other of said source of electric potential and said brake so that said variation in resistance through said layer of resistive material varies the current through said layer of resistive material from said source of electric potential to said brake to vary brake application.

2. A control unit according to claim 1 wherein progressive movement of said contact element increases the length of the engagement of said contact element with said layer of resistive material.

3. A control unit according to claim 1 wherein said contact element is progressively engagable with said resistive layer along a line of engagement on said layer of resistive material.

4. For an electric brake for a vehicle towed by a towing vehicle, a control unit comprising:
a resistance element for providing current therethrough from a source of electric potential to said brake, said resistance element including a layer of resistive material and a conductor electrically connected with said layer of resistive material, said conductor being connectable with one of said source of electric potential and said brake; and
a contact element being engagable with said layer of resistive material for electrical contact therewith and being movable relative to said resistive layer for varying the engagement therewith to vary the resistance between said contact element and said conductor, said contact element being connectable with the other of said source of electric potential and said brake so that said variation in resistance through said layer of resistive material varies the current through said layer of resistive material from said source of electric potential to said brake to vary brake application;
said resistive layer having a configuration which varies the rate of change of said resistance from said contact element to said conductor through said layer of resistive material with varying engagement of said contact element with said layer of resistive material.

5. For an electric brake for a vehicle towed by a towing vehicle, a control unit comprising:
a resistance element for providing current therethrough from a source of electric potential to said brake, said resistance element including a layer of resistive material and a conductor electrically connected with said layer of resistive material, said conductor being connectable with one of said source of electric potential and said brake; and
a contact element being progressively engagable with said layer of resistive material for electrical contact therewith and being movable relative to said resistive layer for varying the engagement therewith to progressively reduce the resistance between said contact element and said conductor, said contact element being connectable with the other of said source of electric potential and said brake so that said variation in resistance through said layer of resistive material varies the current through said layer of resistive material from said source of electric potential to said brake to vary brake application;
said layer of resistive material being configured so that the rate of reduction of said resistance between said conductor and said contact element through said layer of resistive material varies with the progressive engagement of said contact element with said layer of resistive material.

6. A control unit according to claim 5 wherein said resistive material is configured so that the rate of reduction of said resistance between said conductor and said contact element through said layer of resistive material increases with the progressive engagement of said contact element with said layer of resistive material at least during a portion of said progressive engagement of said contact element with said layer of resistive material.

7. For an electric brake for a vehicle towed by a towing vehicle, a control unit comprising:
a resistance element for providing current therethrough from a source of electric potential to said brake, said resistance element including a layer of resistive material and a conductor electrically connected with said layer of resistive material, said conductor being connectable with one of said source of electric potential and said brake; and
a contact element being engagable with said layer of resistive material for electrical contact therewith and being movable relative to said resistive layer for varying the engagement therewith to vary the resistance between said contact element and said conductor, said contact element being connectable with the other of said source of electric potential and said brake so that said variation in resistance through said layer of resistive material varies the current through said layer of resistive material from said source of electric potential to said brake to vary brake application;
said conductor having a configuration which varies the rate of change of said resistance from said contact element to said conductor through said layer of resistive material with varying engagement of said contact element with said layer of resistive material.

8. For an electric brake for a vehicle towed by a towing vehicle, a control unit comprising:
a resistance element for providing current therethrough from a source of electric potential to said brake, said resistance element including a layer of resistive material and a conductor electrically connected with said layer of resistive material, said conductor being connectable with one of said source of electric potential and said brake; and
a contact element being progressively engagable with said layer of resistive material for electrical contact therewith and being movable relative to said resistive layer for varying the engagement therewith to progressively reduce the resistance between said contact element and said conductor, said contact element being connectable with the other of said source of electric potential and said brake so that said variation in resistance through said layer of resistive material varies the current through said layer of resistive material from said source of electric potential to said brake to vary brake application;
said conductor being configured so that the rate of reduction of said resistace between said conductor and said contact element through said layer of resistive material varies with the progressive engagement of said contact element with said layer of resistive material.

9. A control unit according to claim 8 wherein said conductor is configured so that the rate of reduction of said resistance between said conductor and said contact element through said layer of resistive material increases with the progressive engagement of said contact element with said layer of resistive material at least during a portion of said progressive engagement of said contact element with said layer of resistive material.

10. A control unit according to claim 1 wherein said resistive material is deposited on a non-conducting substrate.

11. A control unit according to claim 10 wherein said non-conducting substrate is a ceramic substrate.

12. A control unit according to claim 1 further including a brake light contact associated with said control unit which is disposed for engagement by said contact element and which is connectable with a brake light for said vehicle for lighting said brake light upon engagement by said contact element.

13. A control unit according to claim 1 wherein said brake includes a coil and wherein said control unit further includes means responsive to the impedance of said coil when connected to the one of said conductor and said contact element for indicating whether said coil is connected thereto.

14. A control unit according to claim 1 further including hydraulic means operatively associated with one of said contact element and said resistance element for providing said relative movement therebetween for varying the engagement of said contact element with said layer of resistive material.

15. For an electric brake for a vehicle towed by a towing vehicle, a control unit comprising:
   a resistance element for providing current therethrough from a source of electric potential to said brake, said resistance element including a continuous layer of resistive material and a conductor electrically connected with said layer of resistive material, said conductor being connectable with one of said source of electric potential and said brake; and a contact element having a plurality of conducting fingers disposed for progressive engagement with said continuous layer of resistive material for electrical contact therewith and being movable relative to said resistive layer for varying the engagement therewith to vary the resistance between said contact element and said conductor, said contact element being connectable with the other of said source of electric potential and said brake so that said variation in resistance through said layer of resistive material varies the current through said layer of resistive material from said source of electric potential to said brake to vary brake application.

16. A control system according to claim 15 wherein said contact element includes a metallic member having said plurality of fingers formed therein, said metallic member being of a resilient material so that said fingers are resilient.

17. A control system according to claim 15 wherein said contact element has a pair of spaced rows of said conducting fingers disposed for progressive engagement with said layer of resistive material at spaced locations thereon.

18. A control system according to claim 15 wherein said progressive engagement of said contact element with said layer of resistive material increases the number of said plurality of conducting fingers which engage said layer of resistive material.

19. A control system according to claim 1 wherein said contact element has a plurality of conducting fingers disposed for progressive engagement with said layer of resistive material.

20. A control system according to claim 19 wherein said progressive engagement of said contact element with said layer of resistive material increases the number of said plurality of conducting fingers which engage said layer of resistive material.

* * * * *